United States Patent [19]

Reddy

[11] Patent Number: 4,929,384
[45] Date of Patent: May 29, 1990

[54] PROCESS FOR IMPROVING THE LUMINESCENCE OF NIOBIUM ACTIVATED YTTRIUM TANTALATE X-RAY PHOSPHOR

[75] Inventor: Vaddi B. Reddy, Sayre, Pa.

[73] Assignee: GTE Products Corporation, Stamford, Conn.

[21] Appl. No.: 362,717

[22] Filed: Jun. 7, 1989

[51] Int. Cl.$^5$ .............................................. C09K 11/78
[52] U.S. Cl. .............................................. 252/301.4 R
[58] Field of Search ................................ 252/301.4 R

[56] References Cited

U.S. PATENT DOCUMENTS

| | | | |
|---|---|---|---|
| 3,459,674 | 8/1969 | Emoto et al. | 252/301.4 R |
| 4,024,069 | 5/1977 | Larach | 252/301.4 R |
| 4,225,653 | 9/1980 | Brixner | 252/301.4 R |

FOREIGN PATENT DOCUMENTS

| | | | |
|---|---|---|---|
| 202875 | 11/1986 | European Pat. Off. | 252/301.4 R |
| 49-34311 | 9/1974 | Japan | 252/301.4 R |

OTHER PUBLICATIONS

Brixner et al. "J. Electrochem. Soc.", vol. 130, No. 12, 1983, pp. 2435-2443.

Primary Examiner—Jack Cooper
Attorney, Agent, or Firm—Robert E. Walter; L. Rita Quatrini

[57] ABSTRACT

A process is disclosed for producing M' phase $YTaO_4$:Nb X-ray phosphor which comprises forming a mixture of the components $Y_2O_3$, $Ta_2O_5$, and $Nb_2O_5$, and a flux which can be lithium chloride, lithium sulfate or a mix of lithium sulfate and potassium sulfate in a mole ratio of 80 to 20, the flux making up about 25% to 50% by weight of the mixture, the components being provided in an amount equal to approximately the stoichiometric amounts to form the phosphor, firing the mixture in a furnace by heating to a temperature of about 1200° C. to 1300° C. at a heating rate of about 1.0° C./min. to 1.5° C./min. and maintaining the temperature for about 10 to 14 hours to react the components and produce a fired material containing luminescent material, cooling the material by turning off the heat to the furnace and allowing the material to remain in the furnace until the temperature is no higher than about 300° C., washing with deionized water, removing the wash water and drying, and classifying to obtain a $-325$ mesh particle size in the phosphor, forming a mixture of the phosphor and flux wherein the flux makes up about 10 to 50% by weight of the mixture, firing as before with the temperature being about 1100° C. to 1300° C. and the time being about 2 to 10 hours, cooling, washing, drying and classifying to produce a phosphor having a higher luminescence intensity than phosphors produced absent the second firing step.

1 Claim, No Drawings

PROCESS FOR IMPROVING THE LUMINESCENCE OF NIOBIUM ACTIVATED YTTRIUM TANTALATE X-RAY PHOSPHOR

CROSS REFERENCE TO RELATED APPLICATIONS

This application is related to application Ser. No. 362,720 entitled "A Freon-Free Process For Preparing a Niobium Activated Yttrium Tantalate X-ray Phosphor", and application Ser. No. 362,721, entitled "Process For Preparing A Niobium Activated Yttrium Tantalate X-Ray Phosphor", both assigned to the same assignee as the present application and both filed concurrently herewith.

BACKGROUND OF THE INVENTION

This invention relates to a process for preparing a high brightness niobium activated yttrium tantalate X-ray phosphor having an M' crystal structure by a method in which the heating and cooling schedules are critical. The phosphor is refired with flux resulting in a brightness improvement which is usually at least about 10% over phosphors produced absent the re-firing step.

X-ray phosphors are used in x-ray intensifying screens which are used along with photographic film to enhance the photographic image formed on the film at the same time reducing the x-ray dose on the object during medical radiographic procedures. Phosphor materials used in these intensifying screens are to be colorless single phase with a polyhedral shape of well-defined crystal morphology. Also, the phosphors have to be good x-radiation absorbers and emit the light (energy) in the spectral region to which the photographic film is sensitive. Generally, it is required that the phosphor particle size be about 4-11 micrometers in order to form a thin layer when drawn in the form of screens using certain binder solutions as media. The phosphor material also has to have a high x-ray energy absorbing property. After absorbing the x-ray energy, when exposed, the phosphor should emit photons (light) strongly in the spectral region of the film sensitivity. The efficiency of x-ray energy-to-light conversion should be intense enough to obtain undistorted and sharp film images. The higher the conversion efficiency, the better the images. There are several materials of such kind but only few have good properties necessary to make them as useful materials for intensifying screen applications.

Blasse and Bril (J. Luminescence, 3,109 (1970)) describes the cathodo and photo luminescence properties of various rare-earth tantalate phosphors. These materials have fergunsonite (M-type) monoclinic crystal structure. Wolten & Chase (American Minerologist, 52, 1536 (1967)) report that this type of tantalates (e.g. $YTaO_4$ and other rare-earth tantalates) have two polymorphs, a monoclinic ($I_2$ Space group) structure-M at low temperature and a tetragonal (Scheelite type structure with $I_{41/a}$ space group) at high temperature. Crystal structure transition between these two forms occurs at 1325° C. in $YTaO_4$ and is reversible. They disclose also the formation of a new polymorph of yttrium tantalate and other rare earth tantalates. This new polymorph is obtained when the tantalates are synthesized (crystallized) below the above mentioned (1325° C.) transformation temperature and this polymorph has a monoclinic structure with $P_{2/a}$ space group which is called M' phase. M' phase can be converted to M phase by heating above 1400° C. and then cooling to below the transition (1325° C.) temperature Brixner and Chem (J. Electrochemical Soc., 130 (12), 1983, 2435–43) and U.S. Pat. No. 4,225,653 describe the preparation and the crystal structure of M' phase rare earth tantalate materials and their luminescence properties. They also demonstrate that the M' phase $YTaO_4$ is an efficient host for x-ray phosphor when activated with niobium and some rare earth ions. However, preparation procedure is critical to obtain a single phased M' $YTaO_4$ with increased brightness when activated with niobium. Brixner and Chen recommend the preparation of niobium activated M' rare earth tantalate phosphor by pre-firing the component oxides $TaO_5$, $NbO_5$, and $Ln_2O_3$ (Ln=La, Y, Ce, and Lu) at 1200° C. for 8–10 hours. This is done to make sure that the reactant oxides are free of hydroxides and carbonates. The reaction products are then milled using freon solvent as grinding fluid for about 6 hours using alumina beads as grinding medium. The resulting mixture is then either alone or with 50% by weight lithium sulfate as flux material, fired at 1250° C. for 10–14 hours.

SUMMARY OF THE INVENTION

It is an object of the present invention to provide a process for producing M' $YTaO_4$:Nb x-ray phosphor having a higher luminescence emission efficiency over this type of phosphor produced by prior methods.

It is another object of the present invention to provide a method of improving the luminescence intensity (brightness) of M' $YTaO_4$:Nb phosphor by a simple procedure.

In accordance with one aspect of the invention, there is provided a process for producing M' phase $YTaO_4$:Nb X-ray phosphor which comprises forming a mixture of the components of $Y_2O_3$, $Ta_2O_5$, and $Nb_2O_5$, and a flux which can be lithium chloride, lithium sulfate or a mix of lithium sulfate and potassium sulfate in a mole ratio of 80 to 20, the flux making up about 25% to 50% by weight of the mixture, the components being provided in an amount equal to approximately the stoichiometric amounts to form the phosphor, firing the mixture in a furnace by heating to a temperature of about 1200° C. to 1300° C. at a heating rate of about 1.0° C./min. to 1.5° C./min. and maintaining the temperature for about 10 to 14 hours to react the components and produce a fired material containing luminescent material, cooling the material by turning off the heat to the furnace and allowing the material to remain in the furnace until the temperature is no higher than about 300° C., washing with deionized water, removing the wash water and drying, and classifying to obtain a −325 mesh particle size in the phosphor, forming a mixture of the phosphor and flux wherein the flux makes up about 10 to 50% by weight of the mixture, firing as before with the temperature being about 1100° C. to 1300° C. and the time being about 2 to 10 hours, cooling, washing, drying and classifying to produce a phosphor having a higher luminescence intensity than phosphors produced absent the second firing step.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

It has been demonstrated in U.S. Pat. No. 4,225,653 that the niobium substituted yttrium tantalate which crystallizes in to a monoclinic M-structure gives high x-ray-to-light-conversion efficiency compared to those host materials that crystallize into monoclinic M-structure of the composition that has the same formula, $YTaO_4$. Substitution of niobium for tantalum improves significantly the blue fluorescence of M' structure $YTaO_4$. However, further improvements in brightness properties can enhane the image quality of the radiographs when used in medial radiographic procedures. An object of this invention is to improve the luminescence emission of the $YTa_{1-x}Nb_xO_4$ phosphor to give better quality radiographs when use in intensifying screens. It is required that the phosphor have as high x-ray to photo conversion efficiency as possible to obtain high quality radiographs. The brighter phosphor reduces the x-ray dose to the patient and also gives better and sharper image quality radiographs when used in medical intensifying screens.

A description of the preparation of the phosphor of the present invention is as follows.

A uniform mixture is formed consisting essentially of the components from which the phosphor is to be made and a flux. The components are $Y_2O_3$, $Ta_2O_5$, and $Nb_2O_5$. The components are provided in an amount equal to approximately the stiochiometric amount required to form the phosphor. The flux can be lithium chloride, lithium sulfate or a mix of lithium sulfate and potassium sulfate in a mole ratio of lithium sulfate to potassium sulfate of about 80 to 20 to form a eutectic mixture. The lithium sulfate-potassium sulfate mix is the preferred flux system. The flux makes up from about 25% to about 50% by weight of the mixture and most preferably about 50% by weight. The mixture is formed by any known dry blending technique.

Normally, this mixture is then milled with a milling fluid. The milling fluid can be essentially any in which the oxides and flux are insoluble. Some typical milling fluids are freon, acetone, and other solvents such as methyl alcohol, ethyl alcohol and isopropanol. The normal procedure for milling is in a vibratory mill such as a SWECO mill. A preferred but non-limiting procedure for milling, about 660-670 g of components with an equal amount of flux material is to mill for about 1.0 hours with about 500 ml of milling fluid using about 2 kg of high density alumina beads as milling media.

After the milling step, the milling media and milling fluid are removed from the milled mixture. The milling fluid is removed by allowing the milled mixture and fluid to dry usually at room temperature for a sufficient time to allow all the fluid to evaporate. This amount of time is usually about 6 to 12 hours when freon is used. The milled mixture is dried at from about 120° C. to about 150° C. when the milling fluid is acetone.

An alternate method is to form a first mixture of the reactive components by first dry blending and then milling this first mixture with a milling fluid as described above. The milling fluid can be any of those described above. In addition, water can be used as the milling fluid since the oxides are insoluble in water. The flux can then be added to this first mixture to form a second mixture.

In any case the reactive components and the flux are then fired according to the following specific heating schedule to produce a fired material containing luminescent material. The reactive component-flux mixture is loaded into a furnace typically an electric or gas-fired furnace, preferably in covered alumina containers. The furnace is then heated slowly usually from about 300° C. up to a temperature of from about 1200° C. to about 1300° C. at a heating rate of from about 1.0° C. per minute to about 1.5° C. per minute. This usually takes about several hours. This temperature range is maintained for from about 10 hours to about 14 hours.

The resulting fired material is then cooled according to a specific cooling schedule. The heat to the furnace is turned off and the fired material is allowed to remain in the furnace until the furnace has cooled to no higher than about 300° C. When a temperature of about 300° C. or lower is reached, the cooled material can be taken out of the furnace.

The above described slow heating and cooling procedure ensures better reactivity of the components of the mixture with the flux being melted.

The resulting cooled material is then washed with deionized water to remove the fluxes and other water soluble material that may be present. This is usually done by slurring the cooled material repeatedly with fresh deionized water and testing for absence of sulfates when lithium sulfate is used as the flux or chlorides when lithium chloride is used as the flux. The wash water is then removed from the washed material. Other washes can be put on the material such as alcohols to force dry the phosphor material if desired.

The washed material which is M' phase niobium activated yttrium tantalate phosphor is dried usually at about 120° C. in an oven.

The phosphor is then classified to obtain a $-325$ mesh particle size.

At this stage, the phosphor is then subjected to a firing step. This procedure is described below.

The classified phosphor is then mixed with a flux. The flux is the same type as described above, except that the flux makes up from about 10% to about 50% by weight, of the phosphor-flux mixture, preferably from about 25% to about 33% by weight and most preferably about 25% by weight.

This phosphor-flux mixture is then fired, essentially according to the procedure described above except that the temperature range is from about 1100° C. to about 1300° C. for a time at this temperature is from 2 hours to about 10 hours and preferably from about 4 hours to about 8 hours.

The resulting fired material containing the re-fired phosphor is then cooled, washed, and classified as described previously.

The above described re-firing step results in the phosphor having an improvement in brightness or luminescence efficiency over phosphors produced without this additional firing step. The particle size of the phosphor remains in the 6-11 micrometer range. The enhanced luminescence intensity (brightness) improves the details and sharpens the radiographs obtained during medical radiographic procedures.

To more fully illustrate this invention, the following non-limiting examples are presented.

EXAMPLE 1

About 225.1 grams of $Y_2O_3$, 433.05 grams of $Ta_2O_5$, and 5.316 grams of $Nb_2O_5$ are blended. The blend is then SWECO milled in freon (trichlorotrifluoro ethane) with about 2 kg of ¼" alumina beads as milling media in a SWECO mill for about 2 hours. After milling the material is dried and the alumina beads are separated. About 332 g of litium sulfate flux material is added and the resulting mixture is blended on a mechanical shaker for about 0.5 hour. The material is then loaded into alumina crucibles and fired at about 1290° C. for about 10-14 hours using a slow heating and cooling schedule. After being cooled to room temperature, the fired material is soaked in hot deionized water for about 6-12 hours. The flux material is washed off with subsequent deionized water washings until the wash water is free of sulfate. Once the flux is washed off, the material is filtered, dried at about 120° C. and sieved through a 325 mesh screen. The composition of the resulting phosphor is $YTa_{0.98}Nb_{0.02}O_4$ and it is a M' phase $YTaO_4$. The luminescence intensity of this phosphor is measured by exposing a 5-10 g sample in a cell to 66 KV 25 MA x-radiation and detecting the luminescence emission using a S-20 surface photomultiplier. The signal from the photomultiplier is fed to a photometer and the amplified signal is then plotted on a strip chart and the intensity of emission is compared to a known standard. The luminescence intensity data is given in Table 1. This sample is used as the control for brightness measurements.

EXAMPLE 2

About 225.81 grams of $Y_2O_3$, 433.05 grams of $Ta_2O_5$, 5.316 grams of $Nb_2O_5$, and about 664 grams of $Li_2SO_4/K_2SO_4$ (80:20 mole ratio) are mixed in a polyethylene jar. The total mixture is ball milled in 500-600 ml of acetone for about 1 hour using 2 kg of alumina beads as milling media. The alumina beads are separated and the milled mixture is dried at about 150° C. in an oven overnight. The dried powder after being cooled to room temperature is loaded into alumina crucibles and fired as described in Example 1. The post firing processing steps are similar to those described in Example 1. The phosphor has a composition of $YTa_{0.98}Nb_{0.02}O_4$ is about 97.7% in luminescence intensity (brightness) compared to the phosphor produced according to Example 1. This phosphor sample is blended in a mechanical shaker with about 33 weight percent of $Li_2SO_4$. This blend is loaded into alumina crucibles and is fired for about 6-10 hours using slow heating and cooling program as described above. The fired phosphor is washed as done before. The phosphor obtained is 112.0% in brightness, showing an improvement of 14.3% and is given in Table 1.

EXAMPLE 3

About 225.81 grams of $Y_2O_3$, 433.05 grams of $Ta_2O_5$, 5.316 grams of $Nb_2O_5$ are blended. The blend is SWECO milled for about 2 hours in deionized water as milling fluid using 3.0 kg of ¼" alumina beads as milling media. The milled material is separated from the beads and then filtered and dried. The dried powder is blended with about 332 g of $Li_2SO_4$ flux using a mechanical shaker and the powder is then loaded into alumina crucibles and fired in an electric or gas furnace for about 10-12 hours using a slow heating and slow cooling program. The post firing procedure is similar to the previous examples. The brightness of the phosphor obtained at this step is about 93% compared to that of Example 1. This phosphor is blended with $Li_2SO_4$ flux in an amount of about ¼ to ½ the weight of the phosphor and refired at about 1290° C. for about 6-8 hours using slow heating and cooling program. The fired material is washed as previously described. The material is screened through a −325 mesh screen. The brightness is about 106.9% which is an improvement of about 14% over the first fired sample of this example.

EXAMPLE 4

About 225.81 g of $Y_2O_3$, about 437.47 g of $Ta_2O_5$, and about 2.658 g of $Nb_2O_5$ are blended for about 0.5 hour. About 660 g of LiCl is added to the above mixture and the resulting oxide-flux mixture is dry ball milled using 1.0 kg of ¼" alumina beads as milling media for about 1 hour. The milled material is then separated from the beads and loaded into alumina crucibles and fired at about 1200°-1300° C. for about 10-14 hours using a slow heating and cooling program. The fired material is soaked in hot deionized water and the LiCl is washed off with several subsequent washings. When the wash water is free of chloride, the material is filtered and dried. The dried material is sieved through a −325 mesh screen. The brightness compared to the phosphor prepared by Example 1 is 106.0%. This phosphor (about 620 g) is blended with about 210 g of LiCl. dry blended, and loaded into alumina crucibles and re-fired at the same temperature as above for about 6-8 hours using the same heating and cooling program. Post-firing process steps are similar to the steps done after the first firing. The phosphor is 117.8% in brightness when compared to that prepared by Example 1. The phosphor composition is $YTa_{0.99}Nb_{0.01}O_4$.

EXAMPLE 5

About 225.8 grams of $Y_2O_3$, 433.05 grams of $Ta_2O_5$, 5.316 grams of $Nb_2O_5$ are blended. About 664.17 g of LiCl flux are added and the whole mixture is dry ball milled using alumina beads as milling media for about 1 hour. The mixture, after the beads are separated is loaded into alumina crucibles and fired. Samples are washed, dried, and sieved as described previously. The phosphor is 112.0% in brightness when compared to that prepared by Example 1. The phosphor is then blended with about 210 g of LiCl again and dry blended and re-fired for about 6-8 hours at about 1290° C. Post firing steps are as described previously. The sample is 122.8% in brightness. The phosphor composition is $YTa_{0.98}Nb_{0.02}O_4$.

EXAMPLE 6

A phosphor is prepared according to the procedure described in Example 2 except that is is re-fired without flux material, at about 1100°-1300° C. The brightness did not improve. The brightness after the first firing is about 96.5% and after the re-firing is about 93.95%. The phosphor composition of this example is $YTa_{0.98}Nb_{0.02}O_4$.

The above examples indicate that re-firing the phosphor with flux improves the phosphor brightness by about 10-15% over samples fired without flux during the second firing. Second firing without flux material does not improve phosphor brightness. The examples show that the flux type of niobium concentration does not affect the brightness improvements after the second firing. The data obtained from the various examples is shown in Table 1.

TABLE 1

| Example | XOF Brightness First firing | XOF Brightness Second firing | % Improved Brightness |
|---|---|---|---|
| 1 | 100.0 | | |
| 2 | 97.7 | 112.0 | 14.3 |
| 3 | 93.0 | 106.9 | 13.9 |

TABLE 1-continued

| Example | XOF Brightness First firing | XOF Brightness Second firing | % Improved Brightness |
|---|---|---|---|
| 4 | 106.0 | 117.8 | 11.8 |
| 5 | 112.0 | 122.3 | 10.3 |
| 6 | 96.5 | 94.0 | −1.5 |

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing M'YTaO$_4$:Nb X-ray phosphor, said process comprising:
   (a) forming a uniform mixture consisting essentially of Y$_2$O$_3$, Ta$_2$O$_5$, and Nb$_2$O$_5$ components, and a flux selected from the group consisting of lithium chloride, lithium sulfate and a mix of lithium sulfate and potassium sulfate the mole ratio of lithium sulfate to potassium sulfate in said mix being about 80 to 20, wherein said flux makes up from about 25% to about 50% by weight of said mixture, said components being provided in an amount equal to approximately the stoichiometric amounts required to form said phosphor;
   (b) firing said mixture in a furnace by heating said mixture in said furnace from a temperature of about 300° C. to a temperature of from about 1200° C. to about 1300° C. at a heating rate of from about 1.0° C. per minute to about 1.5° C. per minute and maintaining said temperature for from about 10 hours to about 14 hours to react said components and produce a fired material containing luminescent material;
   (c) cooling the resulting fired material by turning off the heat to said furnace and allowing said fired material to remain in said furnace until the temperature in said furnace is no higher than about 300° C.;
   (d) washing the resulting cooled material with deionized water to remove essentially all of said flux therefrom and produce a washed M' niobium activated yttrium tantalate phosphor;
   (e) removing the wash water from and drying said washed phosphor;
   (f) classifying the resulting dried phosphor to obtain a −325 mesh particle size in said phosphor;
   (g) forming a uniform mixture consisting essentially of the resulting classified phosphor and a flux selected from the group consisting of lithium chloride, lithium sulfate and a mix of lithium sulfate and potassium sulfate the mole ratio of lithium sulfate to potassium sulfate in said mix being about 80 to 20, wherein said flux makes up from about 10% to about 50% by weight off said phosphor-flux mixture;
   (h) firing said phosphor-flux mixture in a furnace by heating said phosphor-flux mixture in said furnace from a temperature of about 300° C. to a temperature of from about 1100° C. to about 1300° C. at a heating rate of from about 1.0° C. per minute to about 1.5° C. per minute and maintaining said temperature for from about 2 hours to about 10 hours to produce a fired material containing the re-fired phosphor;
   (i) cooling said fired material containing said re-fired phosphor by turning off the heat to said furnace and allowing said fired material containing said re-fired phosphor to remain in said furnace until the temperature in said furnace is no higher than about 300° C.;
   (j) washing the resulting cooled material containing said re-fired phosphor with deionized water to remove essentially all of said flux therefrom and produce a washed re-fired M' niobium activated yttrium tantalate phosphor;
   (k) removing the wash water from and drying said washed re-fired phosphor; and
   (l) classifying the resulting dried re-fired phosphor to obtain a −325 mesh particle size in said re-fired phosphor, said re-fired phosphor having a higher luminescence intensity than the phosphor obtained in step (f).

* * * * *